(12) United States Patent
Hodjat et al.

(10) Patent No.: US 8,231,827 B2
(45) Date of Patent: Jul. 31, 2012

(54) METHOD OF MANUFACTURING POWDER METAL PLATES

(75) Inventors: Yahya Hodjat, Oxford, MI (US); Roger Lawcock, Burlington (CA); Rohith Shivanath, Toronto (CA)

(73) Assignee: The Gates Corporation, Denver, CO (US)

( * ) Notice: Subject to any disclaimer, the term of this patent is extended or adjusted under 35 U.S.C. 154(b) by 521 days.

(21) Appl. No.: 12/456,493

(22) Filed: Jun. 17, 2009

(65) Prior Publication Data

US 2010/0322811 A1    Dec. 23, 2010

(51) Int. Cl.
*B22F 5/00* (2006.01)

(52) U.S. Cl. .................. 419/3; 419/25; 419/26; 419/28; 419/43

(58) Field of Classification Search ........................ 419/3
See application file for complete search history.

(56) References Cited

U.S. PATENT DOCUMENTS

| | | | |
|---|---|---|---|
| 3,194,858 A | | 7/1965 | Storchheim |
| 4,042,384 A | * | 8/1977 | Jackson et al. ................. 419/43 |
| 4,148,971 A | * | 4/1979 | Kawano et al. ............... 428/558 |
| 4,365,995 A | * | 12/1982 | Mori .................................. 419/6 |
| 4,383,010 A | | 5/1983 | Spaepen ......................... 429/42 |
| 6,080,357 A | | 6/2000 | Sugikawa ......................... 419/2 |
| 6,436,580 B1 | | 8/2002 | Sugikawa ..................... 429/233 |
| 6,500,582 B1 | | 12/2002 | Sugikawa ..................... 429/217 |
| 6,503,652 B2 | | 1/2003 | Reynolds, III et al. ......... 429/34 |
| 6,699,593 B2 | | 3/2004 | Kaneta et al. ................. 428/670 |
| 7,150,918 B2 | | 12/2006 | Brady ........................... 428/457 |

FOREIGN PATENT DOCUMENTS

| | | |
|---|---|---|
| EP | 0245932 A1 | 11/1987 |
| GB | 697291 A | 9/1953 |
| GB | 776544 A | 6/1957 |
| JP | 2000 202818 A | 7/2000 |

* cited by examiner

*Primary Examiner* — Roy King
*Assistant Examiner* — Christopher Kessler
(74) *Attorney, Agent, or Firm* — J. A. Thurnau, Esq.; T. A. Dougherty, Esq.; P. N. Dunlap, Esq.

(57) ABSTRACT

A method of manufacturing powder metal plates comprising feeding a predetermined mass of metal powder onto a moving tape (101), restricting the metal powder by surrounding the metal powder with vibrating boundary walls (201, 202) extending parallel to the direction of movement of the tape, rolling the metal powder at an ambient temperature to form a green compact strip (GS), continuously sintering the green compact strip in a furnace (400), forming the green compact strip to a net shape part (NS) while in the furnace, and cooling the net shape part in a non-oxidizing environment (404) at a temperature in excess of 1000 degrees Celsius.

19 Claims, 5 Drawing Sheets

|  | FUEL CELLS | | | | |
|---|---|---|---|---|---|
| TYPE | PEMFC | MCFC | SOFC | PAFC | DMFC |
| DESCRIPTION | PROTON EXCHANGE MEMBRANE | MOLTEN CARBONATE | SOLID OXIDE | PHOSPHORIC ACID | DIRECT METHANOL |
| OPERATING TEMPERATURE | 90°C | 650°C | 800-1000°C | 190°C | 120°C |
| APPLICATIONS | TRANSPORTATION, SMALL & LARGE STATIONARY POWER GENERATION, PORTABLE APPLICATIONS, AEROSPACE, MILITARY | LARGE STATIONARY POWER GENERATION | SMALL AND LARGE STATIONARY POWER GENERATION, NICHE TRANSPORTATION | SMALL AND LARGE STATIONARY POWER GENERATION | SMALL TRANSPORTATION NICHE (SUBMARINES), LIGHT DUTY VEHICLES, PORTABLE APPS. |
| ANODE | CARBON PLATE WITH PLATINUM | POROUS Ni / Cr ALLOY | NICKEL OXIDE/ YSZ | CARBON PLATE WITH PLATINUM | CARBON PLATE WITH PLATINUM |
| CATHODE | CARBON PLATE WITH PLATINUM CATALYST | POROUS Ni OXIDE | LANTHANUM MANGANITE | CARBON PLATE WITH PLATINUM CATALYST | CARBON PLATE WITH PLATINUM CATALYST |
| ELECTROLYTE | POLYMER MEMBRANE SATURATED WITH WATER | LITHIUM CARBONATE, SODIUM CARBONATE AND/ OR POTASSIUM, CARBONATE SUPPORTED IN POROUS, SEMISOLID MATRIX OF LITHIUM ALUMINATE | YSZ | PHOSPHORIC ACID ELECTRO- LYTE IS HELD IN A SILICON CARBIDE MATRIX AT THE CATHODE-ANODE INTERFACE | POLYMER MEMBRANE |
| IC | CONDUCTIVE POLYMER, METALLIC | METALLIC | CONDUCTIVE CERAMIC, METALLIC | CONDUCTIVE POLYMER, METALLIC | CONDUCTIVE POLYMER, METALLIC |

(PRIOR ART)
FIG.1

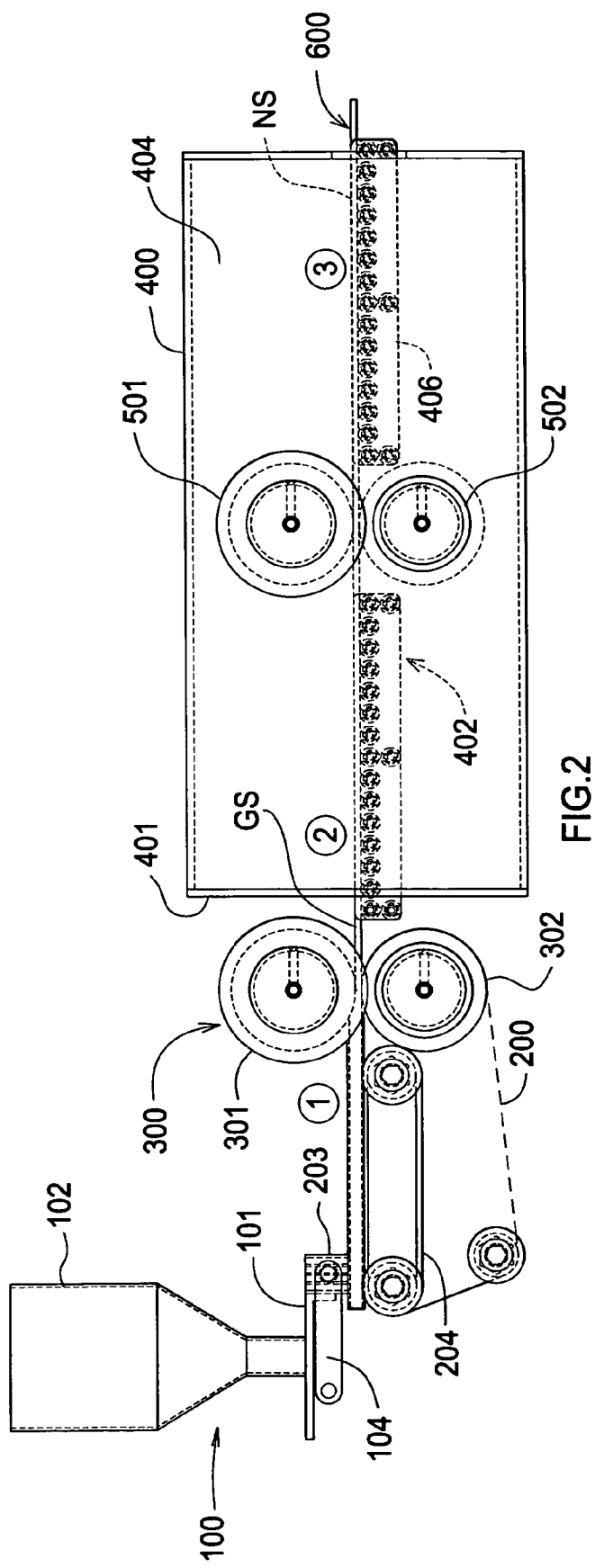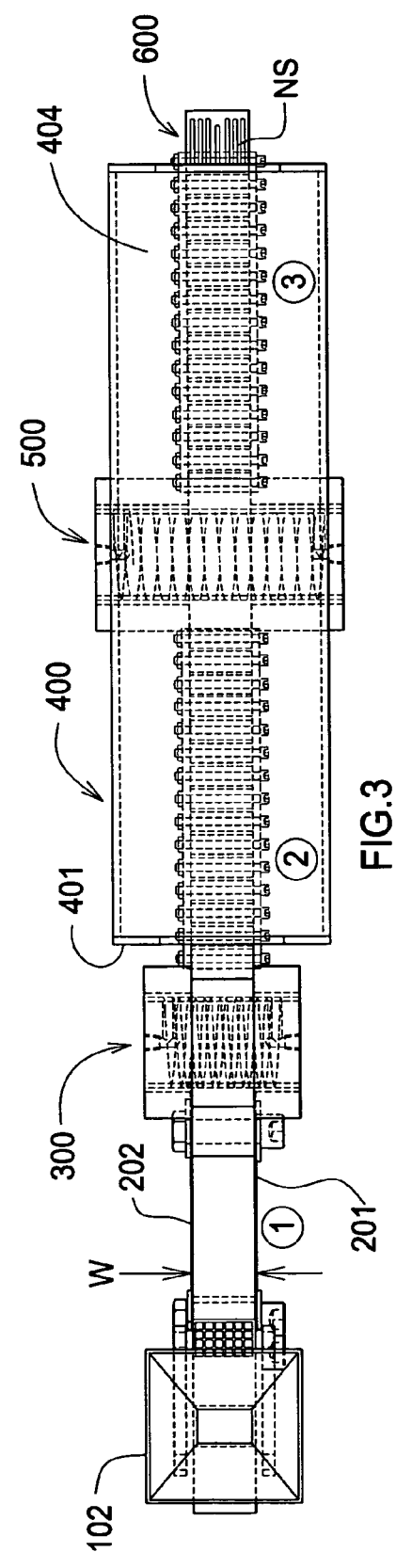

METHOD OF MANUFACTURING POWDER METAL PLATES

FIELD OF THE INVENTION

The invention relates to a method of manufacturing powder metal plates comprising feeding a predetermined mass of metal powder onto a moving tape, restricting the metal powder by surrounding the metal powder with vibrating boundary walls extending in the direction of movement of the tape, rolling the metal powder at an ambient temperature to form a green compact strip, continuously sintering the green compact strip on a conveyer in a furnace, forming the green compact strip to a net shape part while in the furnace, and cooling the net shape part in a non-oxidizing environment at a temperature in excess of 1000 degrees Celsius.

BACKGROUND OF THE INVENTION

The existing art for manufacturing certain powder metal plates, including fuel cell plates, is to use a powder comprising 95% Cr and 5% Fe. The powder is compacted in a press to the desired shape. The green compact is sintered in a furnace at 1120 degrees Celsius. The sintered part is then forge/coin (re-strike) in a press to increase the density and then finally re-sintered at 1400 degrees Celsius.

Representative of the art is U.S. Pat. No. 6,436,580 (2002) which discloses a method of manufacturing porous sheet metal sheet comprising metal powders are spread on a feeding belt or a supporting sheet which is continuously fed; the feeding belt or the supporting sheet on which the metal powders have been spread is passed through a sintering oven; and the metal powders are sintered, with adjacent uncompressed metal powders in contact with each other partly and gaps present therebetween. Consequently, contact portions of the metal powders are integrated with each other and the gaps are formed as fine pores.

What is needed is a method of manufacturing powder metal plates comprising feeding a predetermined mass of metal powder onto a moving tape, restricting the metal powder by surrounding the metal powder with vibrating boundary walls extending in the direction of movement of the tape, rolling the metal powder at an ambient temperature to form a green compact strip, continuously sintering the green compact strip on a conveyer in a furnace, forming the green compact strip to a net shape part while in the furnace, and cooling the net shape part in a non-oxidizing environment at a temperature in excess of 1000 degrees Celsius. The present invention meets this need.

SUMMARY OF THE INVENTION

The primary aspect of the invention is a method of manufacturing powder metal plates comprising feeding a predetermined mass of metal powder onto a moving tape, restricting the metal powder by surrounding the metal powder with vibrating boundary walls extending in the direction of movement of the tape, rolling the metal powder at an ambient temperature to form a green compact strip, continuously sintering the green compact strip on a conveyer in a furnace, forming the green compact strip to a net shape part while in the furnace, and cooling the net shape part in a non-oxidizing environment at a temperature in excess of 1000 degrees Celsius.

Other aspects of the invention will be pointed out or made obvious by the following description of the invention and the accompanying drawings.

The invention comprises a method of manufacturing powder metal plates comprising feeding a predetermined mass of metal powder onto a moving tape, restricting the metal powder by surrounding the metal powder with vibrating boundary walls extending parallel to the direction of movement of the tape, rolling the metal powder at an ambient temperature to form a green compact strip, continuously sintering the green compact strip in a furnace, forming the green compact strip to a net shape part while in the furnace, and cooling the net shape part in a non-oxidizing environment at a temperature in excess of 1000 degrees Celsius.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 a table of prior art fuel cell technologies.
FIG. 2 is a side view schematic of the inventive process.
FIG. 3 is a top view schematic of the inventive process.

DETAILED DESCRIPTION OF THE PREFERRED EMBODIMENT

Figure 4A:
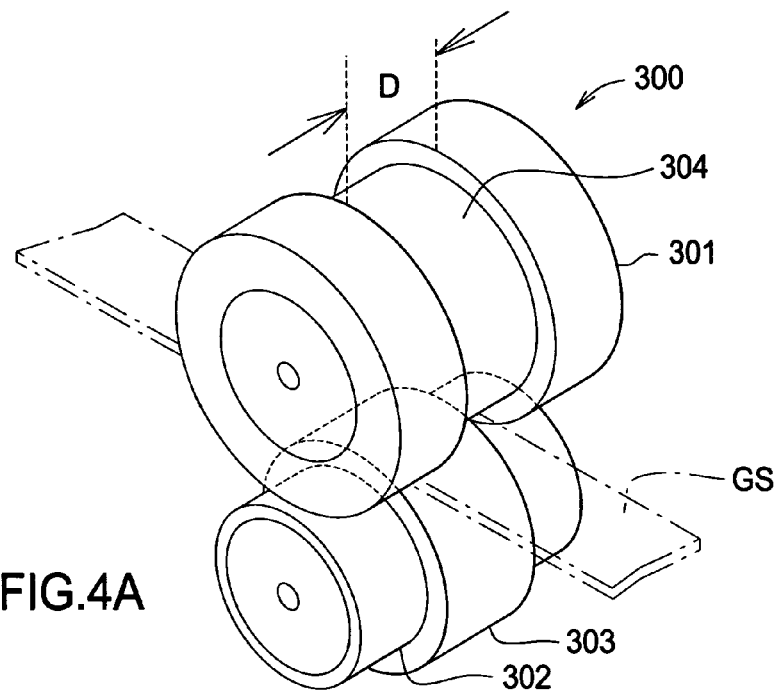
FIG. 4A is a side view of the cold rollers.

Fuel cells are one of the most promising power generation systems for the future. Typically, a solid oxide fuel cell (SOFC) consists of the fuel electrode (anode) and the oxygen electrode (cathode) which are interconnected by an ion-conducting electrolyte. The electrodes are electrically coupled to an electric load by conductors (wires) outside the cell. Solid oxide fuel cells can be operated in a temperature range of approximately 800° C. to 1000° C. in hydrogen with 5% or 50% water at current densities ranging from 0.25 A cm$^{-2}$ to 1 A cm$^{-2}$. The fuel cell typically uses hydrogen as the fuel. Accordingly the powder metal fuel cell plates must be fabricated with this design condition in mind.

FIG. 1 is a table describing prior art fuel cell technologies. As it can be seen in FIG. 1, each cell has certain material requirements. As per FIG. 1, one of the fuel cell types is the solid oxide fuel cell (SOFC). There are six common alloys for the interconnect material of SOFC type of fuel cells. The chromium base type may be composed of 95% chromium, 5% iron, with or without yittria.

This invention improves the manufacturing process of the chromium base SOFC fuel cell plates, also known as interconnect plates, or any other material that cannot be made into sheet metal and coined conventionally due to its lack of formability or ductility. Due to the properties expected from the fuel cell plates the chromium base type is preferred by some fuel cell manufacturers.

The inventive process comprises powder feeding, tape casting, and powder rolling. The combination of all three processes, plus the use of vibrating walls at the feeder is an inventive way to efficiently and quickly make uniform density and uniform thickness fuel cell plates.

Unlike other possible materials, such as different grades of stainless steel that can be made in sheet form and subsequently coined (stamped) in a press, the 95% Cr-5% Fe cannot be made into sheet metal form and cannot be coined due to its very poor formability properties. Consequently, the existing art for manufacturing these plates is to mix 95% Cr with 5% Fe powder; separately compact the powder in a powder metal press to the desired shape; sinter the parts in a furnace at 1120 degrees Celsius; forge/coin (re-strike) the part in a press to increase the density and re-sinter at 1400 degrees Celsius. Each discrete step involves repeatedly handling and moving each part.

The inventive process replaces the prior art manufacturing process with the disclosed process which is simpler, more efficient, and less expensive. Further, it requires less capital in equipment and can be performed in one continuous manufacturing cell. Further, forming the plates at high temperature removes substantially all of porosity in the finished part.

FIG. 2 is a side view schematic of the inventive process. The process uses a powder comprising a mix of 95% Cr with 5% Fe. The powder is compacted by forming the powder into a green compact strip of material similar to a sheet metal using powder feeding, tape casting, and powder rolling. The process generates a green compact strip having a uniform density and uniform thickness with the desired width.

Process.

First, generally in region (1) powder feeding 100 is utilized to feed the metal powder uniformly into a die cavity with a sweeping moving head 101. The powder is typically stored in a bin 102 which feeds by gravity to head 101. Head 101 is feed by a vibratory feeder 104.

In the inventive process, metal powder feeding is done on a moving plastic (or other suitable material) tape 200 where the metal powder is restricted by side walls (201, 202). Side walls 201, 202 are parallel to the feed direction. Powder feeder 101 continuously discharges metal powder thereby keeping the strip always filled with a uniform amount of metal powder. Tape 200 drive system is synchronized and assisted by conveyor 204 which engages the underside of tape 200. Tape casting is typically used to feed ceramic powders into a curing furnace. At each end of the strip, the beginning (input feed) side is restricted with a wall 203, and at the other end by the two rollers 301, 302, see FIG. 2.

The side walls give the metal powder feeding system the height needed to sweep-in feeding the metal powder on the tape. Walls (201, 202) also prevent the loose powder from falling sideways. A wall 204 also controls the powder as it flows onto the tape.

In order for walls (201, 202, 204) not to create too much friction or stick to the metal powder, they are being vibrated at all times. Walls (201, 202) end at the rollers 300, but the tape is pulled into and through the rollers, namely, by the roller 302.

FIG. 3 is a top view schematic of the inventive process. Next, powder rolling is performed. Although rollers 301, 302 are rolling a flat green strip, one has a top-flat hill 302 and the opposite one has a bottom-flat valley 303, see FIG. 4A. The flat width (D) is the width of the plastic tape 200 which is the width of the green compact strip (GS) as it emerges from the rollers 301, 302. Plastic tape 200 is rolled away from the green strip after rolling.

Next, generally in region (2) the continuous green compact strip (GS) is fed into a furnace 400 supported by a moving high temperature conveyer 402. Green compact strip GS travels through a gate 401 that is used on powder metal sintering furnaces to contain an oxygen free furnace environment. The travel length for the strip GS is long enough to bring it up to the 1400 degree Celsius (or any other desired) temperature and deliver it to the net-shape rollers 501, 502 which are inside the furnace 400. Hot rolling of the strip GS occurs at the sintering temperature. Dwell time in the furnace at the sintering temperature is approximately 30 minutes.

The thickness of the green strip GS in the first rolling operation 300 is calculated and adjusted to deliver the exact weight (mass) of material (plus a fraction of approximately one percent for safety, if needed) at a constant width to the final rolling operation at rollers 500. The density change is accounted for in going from the cold green compact strip to the hot net-shape part. As a result, proper control of the mass flow from feeder 101 is important. Control of the volume of the metal in the strip GS is less critical as the volume and thickness will be reduced by hot rolling at 500, which reduces or completely eliminates porosities.

Figure 4B:
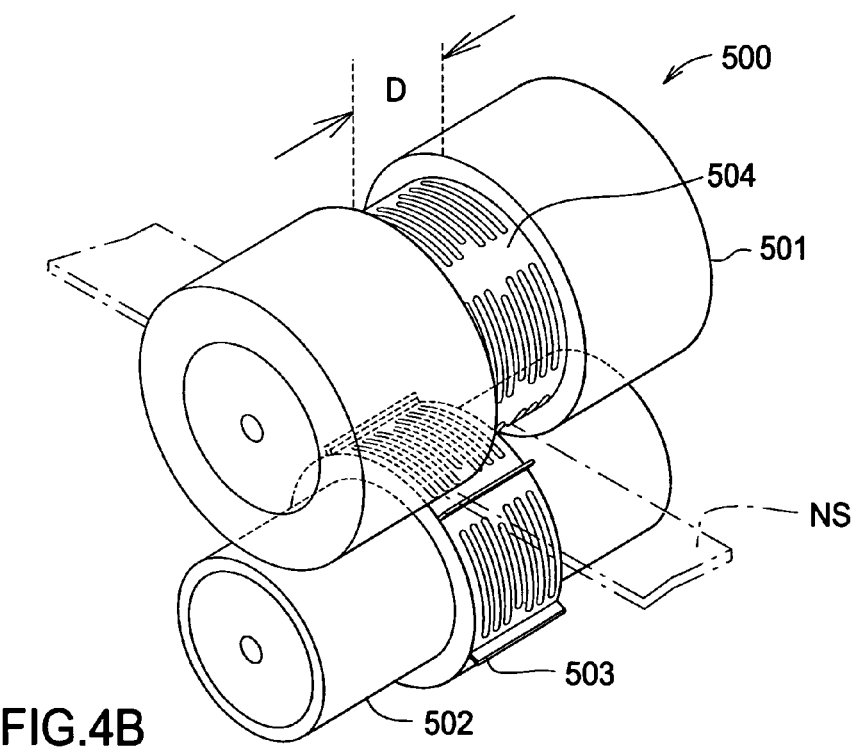
FIG. 4B is a side view of the hot rollers.

The net-shape rollers 500 apply the same principles of hills 503 and valleys 504, see FIG. 4B, to assure side compaction is accurate and to eliminate side flash, which represents waste. Each surface 503 and 504 comprises the surface features suitable to impress the proper form and features in the finished net shape part NS. In terms of side confinement, this is similar to a rolling mill operation for most metals where the sides are kept constant.

The rolling operation in the furnace requires that rollers (501, 502) be internally water cooled with inserts in the forming areas. Since the rolling is done at high temperatures in the furnace the compaction is to net final shape with little or no porosity left in the finished part. In order for the final net shape hot rolling to be successful, the green compacted strip GS must be of uniform density and uniform thickness.

After the rolling operation 500 is finished, the net shape parts (NS) are cooled in the non-oxidizing environment 404 of the furnace and subsequently they exit the furnace 600. Once again, a protective reducing atmosphere is needed to prevent oxidation of the material, generally in region (3).

After exiting the furnace, small amounts of flash (if any) between parts are de-flashed by any of known processes. There should be no flash on the sides due to side restrictions in the rollers 300 and 500. The rolling arrangement can be either two rolls, or two rolls supported by larger back supporting rolls. This is similar to rolling mills, where by using smaller rolls a more concentrated force over a smaller surface area is achieved, while the larger rolls prevent the deflection of smaller diameter rolls.

Since forming by rolling presses the powder in a much localized and narrow band comparing with coining in a press, it is possible to generate much higher localized compressive stresses on the powder than a press compaction, where the entire part is subjected to the forming stresses at once. Consequently, the inventive process achieves a high compaction, especially at high temperatures so that porosity is completely eliminated.

Using the prior art, powder metal presses for manufacturing such fuel cell plates can be very costly due to the high tonnage requirements. However, using the inventive process localized compacting by powder rolling requires simpler, lower tonnage, and lower cost equipment.

Figure 6:
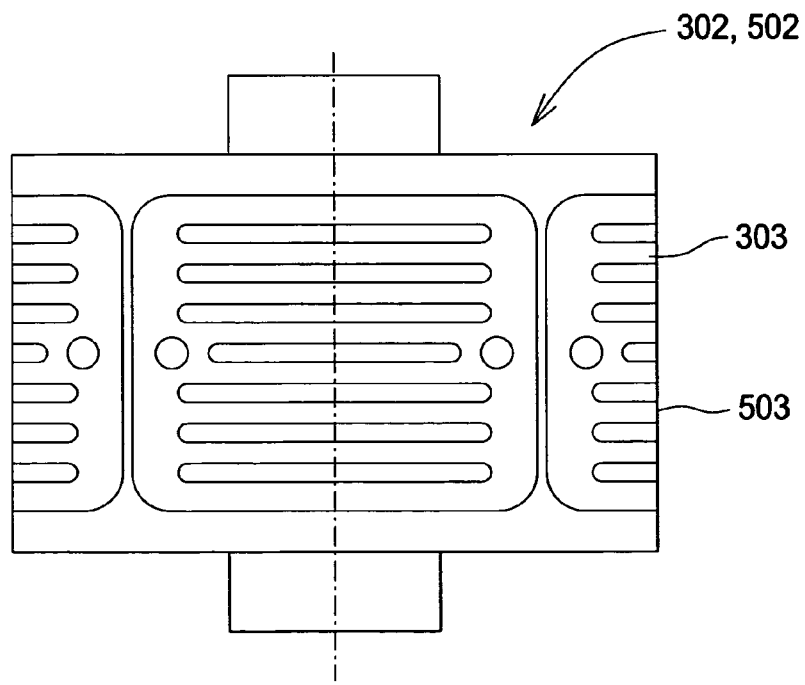
FIG. 6 is a side view of the roller surface.

FIG. 6 is a side view of the rollers. Each roller (302, 502) comprises an outer surface 303, 503 respectively. Each surface 303, 503 is the "negative" or inverse of the plate being rolled. Each surface 303, 503 cooperates with surface 304, 504 respectively, see FIG. 4A and 4B. In an alternative embodiment, roller 302 does not have a "negative" feature surface, instead the surface is simply flat as shown in FIG. 4A.

Figure 7:
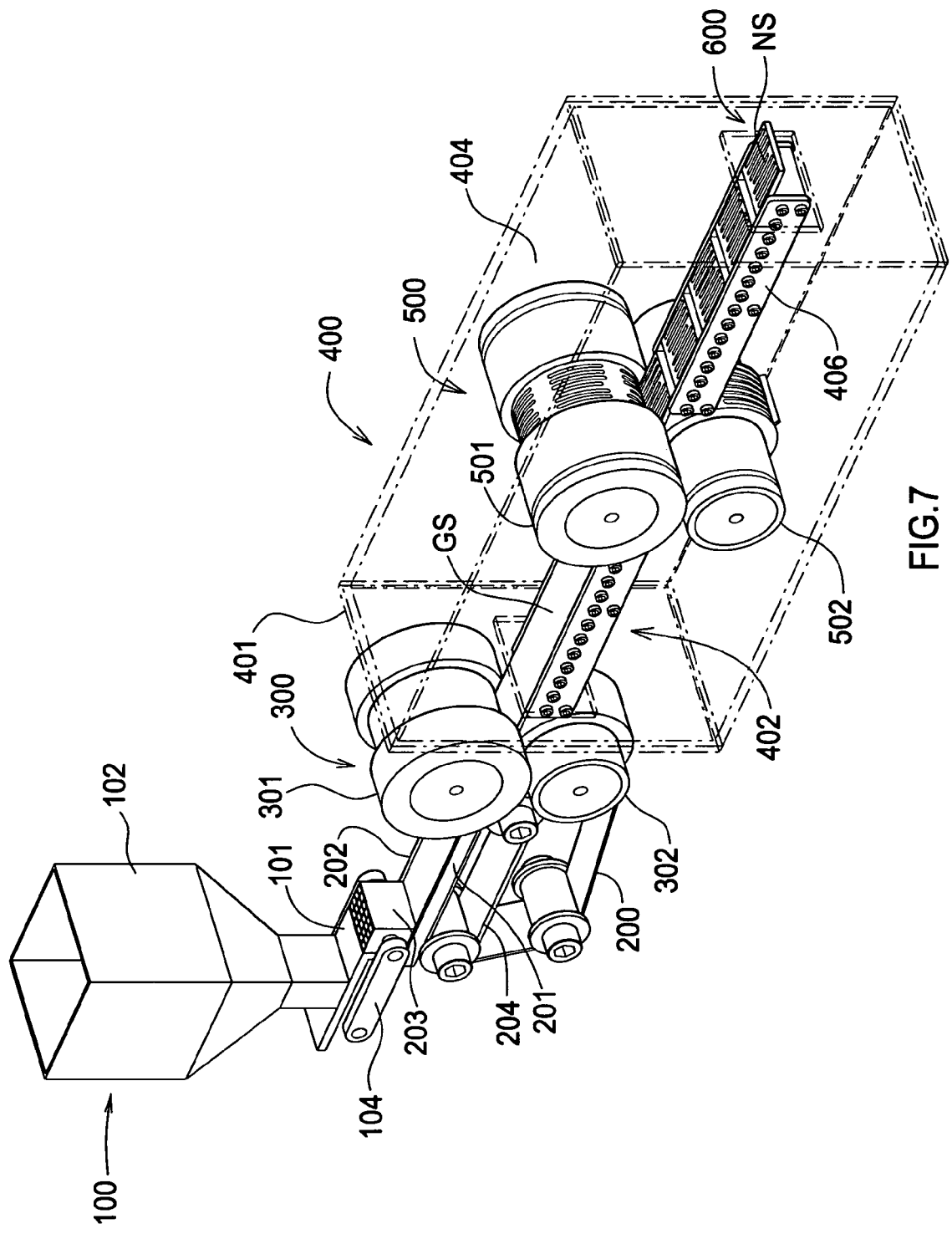
FIG. 7 is a perspective view of the system.

FIG. 7 is a perspective view of the system. The net shape parts NS exit the furnace in a continuous strip or as individual parts separated after the final rolling. The parts are then separated and processed for storage or installation. Roller conveyor 405 supports the green strip GS. Roller conveyor 406 supports the net shape parts NS.

The inventive process can be modified in many different ways. A significant part of the process is the first step of generating a strip of green compacted powder with consistent and uniform thickness and consistent and uniform density, similar to that for a sheet metal. The disclosed process teaches a conventional furnace and hot rolling for the second stage.

Other alternatives include induction heating rather than using a conventional furnace. A protective non-oxidizing atmosphere is needed. The induction heating eliminates the need to use a long furnace.

Another alternative is hot forging rather than hot rolling. The green compacted strip can be fed into a forging press after being heated in the furnace or induction heating. A press type knife can be used to cut a certain length of the hot strip that is then fed into the forging press. This results in the delivery of a precise and uniform weight of the metal into the die cavity. In the alternate embodiment the forging press is located in the same location as rollers 500. Although hot rolling is preferred due the need to apply localized pressure, forging at the high temperature of approximately 1400 degrees Celsius (or any other desired temperature) can also significantly reduce the porosities.

Figure 5:
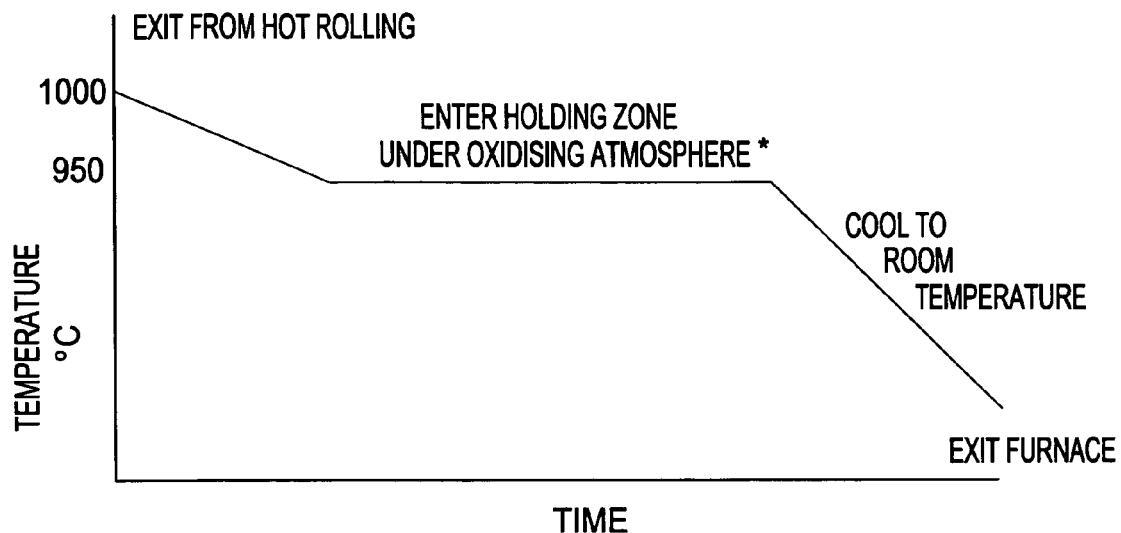
FIG. 5 is a graph showing a cooling trend for the part.

In yet another alternative, during the cooling stage the net formed parts may be introduced to an oxidizing atmosphere upon reaching a temperature of approximately 1000 degrees Celsius and below. This allows the part to be stabilized for its intended service conditions in fuel cell service. For example, this can be accomplished by having the parts exit into a belt furnace zone which has a controlled temperature below 1000 degrees Celsius with an appropriate atmospheric air flow. FIG. 5 is a graph showing a cooling trend for the part wherein the part exits the reducing atmosphere and it cooled and then enters a holding zone for an oxidizing atmosphere. The hold time in the oxidizing atmosphere is on the range of approximately ten to twelve hours.

The weight of metal powder delivered to the cavity could be a fraction of approximately one percent more than the weight of the finished part to assure complete filling of the die cavity. The extra weight will result in a very slight and thin layer of flash that can be removed easily.

The advantages of the inventive process include a process with much lower cost; a process with much lower capital cost; easier processing steps and eliminating complexity; improved quality, namely, the porosity in the part is going to be zero or extremely low. Further it enables use of only one continuous and compact manufacturing cell to make the finished part.

Although the inventive process can be used to manufacture solid oxide types of fuel cells, this method may be used in any similar application where there is a need for plates that can handle high temperature electrolyte without corroding and with a given degree of expansion at higher temperatures. Lastly, this process can be used for any material that cannot be made into sheet metal and has little or no formability.

Although a form of the invention has been described herein, it will be obvious to those skilled in the art that variations may be made in the construction and relation of parts without departing from the spirit and scope of the invention described herein.

We claim:

1. A method of manufacturing powder metal plates comprising:
    feeding a predetermined mass of metal powder onto a moving tape (101);
    restricting the metal powder by surrounding the metal powder with vibrating boundary walls (201, 202) extending parallel to the direction of movement of the tape;
    rolling the metal powder at an ambient temperature to form a green compact strip (GS);
    continuously sintering the green compact strip in a furnace (400);
    forming the green compact strip to a net shape part (NS) while in the furnace; and
    cooling the net shape part in a non-oxidizing environment (404) at a temperature in excess of 1000 degrees Celsius.

2. The method as in claim 1 further comprising exposing the net shape part to an oxidizing atmosphere at a temperature at or below 1000 degrees Celsius.

3. The method as in claim 1 further comprising continuously sintering the green compact strip at a temperature of approximately 1400 degrees Celsius.

4. The method as in claim 1 further comprising rolling the green compact strip to a net shape part occurs at a temperature of approximately 1400 degrees Celsius.

5. The method as in claim 1, wherein the furnace comprises an induction furnace.

6. The method as in claim 1, wherein forming the green compact strip comprises hot forging the green compact strip.

7. The method as in claim 1, wherein forming the green compact strip comprises hot rolling the green compact strip.

8. The method as in claim 6 further comprising the step of cutting the green compact strip before hot forging.

9. The method as in claim 2, wherein the exposing is for a period in the range of approximately ten to twelve hours.

10. A method of manufacturing powder metal plates comprising:
    feeding a predetermined mass of metal powder onto a moving tape;
    restricting the metal powder by surrounding the metal powder with vibrating boundary walls extending in the direction of movement of the tape;
    rolling the metal powder at an ambient temperature to form a green compact strip;
    continuously sintering the green compact strip in a furnace;
    forming the green compact strip to a net shape part while in the furnace; and
    cooling the net shape part in an oxidizing environment at a temperature below 1000 degrees Celsius.

11. The method as in claim 10 further comprising continuously sintering the green compact strip at a temperature of approximately 1400 degrees Celsius.

12. The method as in claim 10, wherein rolling the green compact strip to a net shape part occurs at a temperature of approximately 1400 degrees Celsius.

13. The method as in claim 10, wherein the furnace comprises an induction furnace.

14. The method as in claim 10, wherein forming the green compact strip comprises hot forging the green compact strip.

15. The method as in claim 10, wherein forming the green compact strip comprises hot rolling the green compact strip.

16. The method as in claim 14 further comprising the step of cutting the green compact strip before hot forging.

17. A method of manufacturing powder metal plates comprising:
    feeding a predetermined mass of metal powder onto a moving tape;
    restricting the metal powder by surrounding the metal powder with vibrating boundary walls extending in the direction of movement of the tape;
    rolling the metal powder at an ambient temperature to form a green compact strip;
    continuously sintering the green compact strip on a conveyer in a furnace;

rolling the green compact strip to a net shape part while in the furnace at the sintering temperature; and
cooling the net shape part in a non-oxidizing environment at a temperature in excess of 1000 degrees Celsius.

18. The method as in claim 17, wherein continuously sintering the green compact strip at a temperature of approximately 1400 degrees Celsius.

19. The method as in claim 17, wherein rolling the green compact strip to a net shape part occurs at a temperature of approximately 1400 degrees Celsius.

* * * * *